UNITED STATES PATENT OFFICE.

GUSTAV LINDENTHAL, OF PITTSBURG, PENNSYLVANIA.

PROCESS OF REFINING IRON.

SPECIFICATION forming part of Letters Patent No. 380,442, dated April 3, 1888.

Application filed May 14, 1887. Serial No. 238,208. (No specimens.)

*To all whom it may concern:*

Be it known that I, GUSTAV LINDENTHAL, a citizen of the United States, residing at Pittsburg, in the county of Allegheny and State of Pennsylvania, have invented certain new and useful Improvements in the Process of Refining Iron, of which the following is a specification.

The object of my invention is to retain the fluidity of the bath of molten iron for the purpose of a more thorough dephosphorization in the presence of basic material.

My invention consists in the process hereinafter described of refining iron by the addition of aluminum to the molten metal in the presence of a basic material, whereby the metal is dephosphorized, desulphurized, and purified.

In the conversion of pig-iron into malleable iron the impurites are removed either in a reverberatory furnace or in a Bessemer converter by the air-blast. As is well known, the silicon and carbon are burned out first, while the sulphur and phosphorus, having a greater affinity to the iron, leave the same toward the end of the refining process only in the presence of basic material, with which they may unite and go into the slag. The iron thereby becoming purer becomes less fluid because the melting-point of pure iron is higher (about 4,000° Fahrenheit) than that of impure iron or iron alloys. When the molten iron becomes pasty, an intimate contact of the same with the basic material is prevented, and the dephosphorization and desulphurization practically cease. If on the other hand the fluidity of purer iron is increased by the application of external heat as in a reverberatory or puddling furnace, then the greater affinity of phosphorus to iron at a higher heat forms another obstacle to its purification. From this it will be seen that the essential and simultaneous conditions necessary for a more complete elimination of phosphorus are as follows: First, the more or less complete absence of silicon and carbon in the iron bath; second, the great fluidity of the bath for a more intimate contact of the molten iron with the basic material; third, a temperature lower than needed for melting good wrought-iron for bringing the basic material into contact with the molten iron when its affinity to phosphorus is weakened.

The addition of aluminum, either alone or as an alloy, or other suitable combination to molten iron, has the well-known effect of increasing the fluidity of the same without detriment to its quality; or, in other words, aluminum reduces the melting-point of iron 300° to 500°, according to the amount added. I avail myself of this property of aluminum to effect a more efficient dephosphorization of iron in the following manner:

The molten pig-iron is first desiliconized or decarbonized in one of the usual manners—i. e., in a reverberatory or puddling furnace by burning out under a reverberatory flame with or without the addition of iron ore for a more efficient oxidation of the impurities—then toward the end of the refining process, after the silicious slag has been drawn off or removed from the bath, the addition of crushed fresh iron ore, calcined dolomite, and aluminum is made, the latter preferably in the more convenient and cheaper form of an aluminum alloy previously melted in a separate furnace or cupola. Another and a more efficient method is to first desiliconize and decarburize the molten pig-iron in a Bessemer converter having an acid lining, and then to transfer the same, for the intended further purification, to a reverberatory, puddling, or rotary furnace.

The aluminum can be added to the metal in the converter before pouring into the ladle, or into the ladle itself, so that it shall thoroughly mix with the iron before transfer to a separate furnace, where the dephosphorization is effected on a basic lining and by additions of basic material, preferably calcined dolomite.

It is immaterial whether the refining process—the elimination of silicon, carbon, and phosphorus, and other impurities—takes place in the same furnace and in one continuous operation, as in the open-hearth and puddling furnace, or whether the first part of the refining process—i. e., the desiliconization and decarburation—takes place in a separate furnace, as in the open-hearth or in the Bessemer converter, and the dephosphorization and desulphurization take place in another furnace as in a puddling, rotary, or revolving furnace, or in another converter, all of them having a basic lining. In any of these steps or combination of steps the addition of aluminum should preferably take place after the silicon and carbon have been for the greater part removed from the bath and after the silicious slag has been drawn off.

The best result in practice I obtain by refining the iron first in a Bessemer converter and then transferring the charge mixed with the proper amount of aluminum to a rotary furnace having an iron-ore or basic lining. The molten iron which in this manner had been purified of the silicon and carbon in the converter and then transferred to the rotary furnace ordinarily assumes a pasty condition or comes to nature in about three to five minutes; but with the aluminum added to it it requires nearly twice as long for coming to nature, and during this longer time a more complete dephosphorization takes place. The amount of aluminum ordinarily added, either pure or in the cheaper form of an alloy or like combination, is about one-tenth per cent. A phosphoric iron will of itself have more fluidity than a purer iron; but as the dephosphorization progresses it would soon lose the same, so that the amount of aluminum does not primarily depend on the greater or smaller amount of phosphorus in the pig-iron.

An amount of aluminum greater than two (2) per cent. causes the iron to be red short, while a smaller amount is without detrimental effect on the same but rather improves the quality of the iron.

I am aware that the addition of aluminum to molten wrought iron or steel is not new, but has been patented and is practiced in the manufacture of steel and wrought-iron castings. I do not therefore claim the addition of aluminum to iron or the fusing of the same together for improving the quality of the metal or for any products manufactured from such metal.

Having thus described my invention, what I claim, and desire to secure by Letters Patent, is—

1. The process herein described of purifying cast or pig iron, which consists in first desiliconizing and decarbonizing the metal, then adding aluminum to the molten metal and bringing the same in contact with basic material to react on the phosphatic and other impurities in the iron, as set forth.

2. The process herein described of refining iron, which consists in first desiliconizing and decarbonizing the molten cast-iron, then adding aluminum and bringing the molten metal into contact with iron ore or other suitable basic material to react on the phosphatic and other impurities, then subjecting the charge to a puddling action until the metal is reduced to wrought condition to form a ball or loop, as set forth.

In testimony whereof I affix my signature in presence of two witnesses.

GUSTAV LINDENTHAL.

Witnesses:
 WILLIAM J. EAST,
 C. M. BARTBERGER.